US012669594B2

(12) United States Patent
Parolini et al.

(10) Patent No.: US 12,669,594 B2
(45) Date of Patent: Jun. 30, 2026

(54) METHOD AND DEVICE FOR DETERMINING A DETECTION RANGE OF A SENSOR OF A MOTOR VEHICLE

(71) Applicant: Bayerische Motoren Werke Aktiengesellschaft, Munich (DE)

(72) Inventors: Luca Parolini, Landshut (DE); Sebastian Schneider, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 206 days.

(21) Appl. No.: 18/274,744

(22) PCT Filed: Jan. 13, 2022

(86) PCT No.: PCT/EP2022/050582
§ 371 (c)(1),
(2) Date: Jul. 28, 2023

(87) PCT Pub. No.: WO2022/161772
PCT Pub. Date: Aug. 4, 2022

(65) Prior Publication Data
US 2024/0426984 A1 Dec. 26, 2024

(30) Foreign Application Priority Data

Feb. 1, 2021 (DE) ..................... 10 2021 102 199.5

(51) Int. Cl.
*G06T 7/80* (2017.01)
*G01S 7/40* (2006.01)
(Continued)

(52) U.S. Cl.
CPC ............... *G01S 7/497* (2013.01); *G01S 7/40* (2013.01); *G06T 7/80* (2017.01); *H04L 67/125* (2013.01)

(58) Field of Classification Search
CPC ...... G01S 11/12; G01S 13/931; G01S 17/931; G01S 7/40; G01S 7/4082; G01S 7/497; G06T 7/80; G06V 20/58; H04L 67/125
See application file for complete search history.

(56) References Cited

U.S. PATENT DOCUMENTS 6,147,637 A     11/2000   Morikawa et al.
2004/0168148 A1*  8/2004  Goncalves ........... G05D 1/0231
                                           717/104
(Continued)

FOREIGN PATENT DOCUMENTS

CN            108603938 A     9/2018
DE   10 2015 106 567 A1   11/2015
(Continued)

OTHER PUBLICATIONS

International Search Report (PCT/ISA/210) issued in PCT Application No. PCT/EP2022/050582 dated Jun. 29, 2022 with English translation (8 pages).

(Continued)

*Primary Examiner* — Matthew J. Reda
(74) *Attorney, Agent, or Firm* — Crowell & Moring LLP

(57) ABSTRACT

A method for determining a detection range of a sensor installed in a motor vehicle is provided. The sensor scans a surroundings of the motor vehicle. The method includes detecting a predefined object in the surroundings of the motor vehicle by way of the sensor, determining a distance of the detected object to the motor vehicle and determining the detection range based on the determined distance.

7 Claims, 1 Drawing Sheet

(51) Int. Cl.
  *G01S 7/497* (2006.01)
  *H04L 67/125* (2022.01)

(56) References Cited

U.S. PATENT DOCUMENTS

| | | | | |
|---|---|---|---|---|
| 2013/0226514 A1* | 8/2013 | Kim | .......................... | G01S 3/782 |
| | | | | 702/152 |
| 2015/0314785 A1 | 11/2015 | Kwon | | |
| 2016/0349753 A1* | 12/2016 | Tojima | ................... | G05D 1/027 |
| 2017/0008521 A1* | 1/2017 | Braunstein | ............. | G01C 21/30 |
| 2018/0052222 A1* | 2/2018 | Zeisler | ................. | G01S 17/931 |
| 2018/0299548 A1* | 10/2018 | Noguchi | ............... | G01S 17/931 |
| 2018/0322784 A1* | 11/2018 | Schild | ................... | G08G 1/163 |
| 2018/0372841 A1* | 12/2018 | Hieida | ................... | G01S 13/89 |
| 2019/0051063 A1* | 2/2019 | Tatourian | ................ | G07C 5/02 |
| 2019/0339361 A1* | 11/2019 | Fechner | ............... | G01S 13/931 |
| 2020/0124447 A1* | 4/2020 | Schwindt | ............ | G01D 18/002 |
| 2021/0141079 A1* | 5/2021 | Ichinose | ................ | G01S 13/93 |
| 2021/0396847 A1* | 12/2021 | Ono | ...................... | G01S 7/4812 |
| 2022/0135028 A1* | 5/2022 | Bialer | .............. | B60W 30/0956 |
| | | | | 701/26 |

FOREIGN PATENT DOCUMENTS

| | | |
|---|---|---|
| DE | 10 2016 201 250 A1 | 8/2017 |
| DE | 10 2019 216 071 A1 | 4/2020 |
| DE | 10 2019 203 132 A1 | 9/2020 |
| EP | 3 693 244 A1 | 8/2020 |
| WO | WO 2017/180394 A1 | 10/2017 |

OTHER PUBLICATIONS

German-language Written Opinion (PCT/ISA/237) issued in PCT Application No. PCT/EP2022/050582 dated Jun. 29, 2022 (14 pages).

German-language Search Report issued in German Application No. 10 2021 102 199.5 dated Jan. 10, 2022 with partial English translation (12 pages).

Chinese-language Office Action issued in Chinese Application No. 202280012572.4 dated Nov. 8, 2025, with English translation (15 pages).

\* cited by examiner

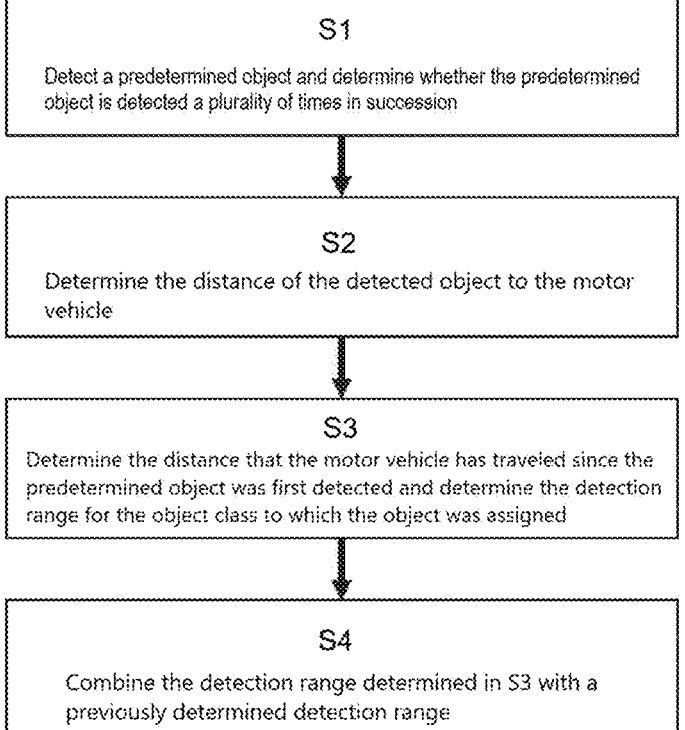

METHOD AND DEVICE FOR DETERMINING A DETECTION RANGE OF A SENSOR OF A MOTOR VEHICLE

BACKGROUND AND SUMMARY OF THE INVENTION

The present invention relates to a method for determining a detection range of a sensor that is installed on a motor vehicle and scans a surroundings of the motor vehicle, and a motor vehicle that is designed so as to perform the method.

A driving assistance system, such as a highway pilot, which performs longitudinal and lateral vehicle guidance of a motor vehicle on highways up to a speed of 130 km/h under various weather conditions, depends on reliable detection of objects in the vehicle surroundings.

For this purpose, sensors are installed on the vehicle that scan the surroundings of the vehicle and can detect predetermined objects, in other words objects to be detected, in the surroundings of the vehicle. Such sensors output a list of detected objects, in other words a list in which each object corresponds to an object that is to be detected in the real world by the respective sensor. In the case of LIDAR sensors and RADAR sensors, these objects usually include other road users but can also include guardrails or, especially in the case of LIDAR sensors, traffic signs due to their high reflectivity. Since the detection capabilities of a camera go beyond this, they can also detect objects other than road markings, traffic lights, tunnels, etc. The sensors usually provide a classification of an object type of the detected object (for example pedestrian, car, truck, bicyclist, sign, etc.), sometimes even a probability distribution over predetermined object types in order to model ambiguities in the respective detection algorithms, for example, when the sensor is not sure whether a detected object is a bicyclist or motorcyclist but is fairly certain that it is not a truck.

It is problematic to determine a detection range or field of view of a sensor, especially for different types or classes of objects, since, for example, in changing weather conditions, it is not always possible to expect a nominal sensor performance, in other words a maximum detection range that can be provided by the sensor.

Thus, if based on sensor data from a sensor an object cannot be detected at a particular location or position, this can be either because an object is not actually present at that position, or because the sensor cannot scan or observe that position, for example due to a hardware failure, a software failure, and/or due to external influences such as weather and/or occlusion of the position, the latter being the more critical case.

In order to counteract this, it is conventionally proposed to check whether the sensor detects static objects in a motor vehicle surroundings that are present there according to map data and should be detected by the sensor at nominal performance.

This map-based approach reaches its limits, particularly in dense traffic, especially when real objects begin to obscure the objects that are predetermined to be detected using the map data, such as traffic signs. Such a system is also dependent on the surroundings having sufficient and precisely the type of predetermined objects which are required for distance estimation. If such infrastructure elements or predetermined objects are sparse, the detection range cannot be determined with sufficient certainty. In addition, such a system relies on accurate localization of the predetermined objects within the map and on the map being up-to-date.

Conventionally, a field of view of a sensor is also determined based on statistics which are derived offline from marked data.

However, this data-driven approach requires large amounts of labeled training data which must include a good, undistorted representation of an expected surroundings to which the sensor will be exposed. Such training data is difficult to obtain and label. There is also the residual risk that the sensor will encounter situations outside the training data where the field of view can no longer be estimated.

Consequently, conventional sensors are not able to reliably detect or determine their detection range based solely on their own acquired data when the sensor is in operation.

Against the background of this prior art, the object of the present invention is to provide an apparatus and a method which are each suitable for overcoming at least the above-mentioned disadvantages of the prior art.

In particular, it is to be made possible when the sensor is in operation to determine the actual field of view or the detection range of a sensor based on its detected data.

The object is achieved by the features of the claimed invention.

Accordingly, the object is achieved by a method for determining a detection range of a sensor that is installed on a motor vehicle, wherein the sensor scans a surroundings of the motor vehicle.

It is conceivable that the sensor is a camera, in particular a video camera. The detection range can also be used to determine a detection area of the sensor which is designed for example in a semi-circular shape, in particular with an angle of view of 150°, and has the determined detection range as a radius.

The method comprises a step of detecting a predetermined object, in particular a further vehicle, such as a further motor vehicle, and/or a pedestrian, in the surroundings of the motor vehicle by way of the sensor.

Moreover, the method comprises determining a distance of the detected object to the motor vehicle, and determining the detection range based on the determined distance.

It is conceivable that moreover it is determined whether the predetermined object is detected a plurality of times in succession, in particular in a predetermined time period without interruption, in the surroundings of the motor vehicle by way of the sensor. It is also conceivable that the determination of the detection range is only or exclusively performed based on the distance of the predetermined object if the predetermined object was detected a plurality of times in succession in the surroundings of the motor vehicle by way of the sensor.

In order to determine the detection range, it is possible to use the distance of the predetermined object which was determined at the point in time at which the predetermined object was detected the first time of the plurality of times by way of the sensor.

The method can moreover comprise determining a distance which the motor vehicle has traveled since the point in time at which the predetermined object was detected the first time of the plurality of times by way of the sensor.

The detection range can then be determined based on a difference between the distance of the predetermined object, which was determined at the point in time at which the predetermined object was detected the first time of the plurality of times by way of the sensor, and the determined distance or distance which the motor vehicle has traveled in the meantime.

Moreover, the method can comprise assigning the detected predetermined object to one of the plurality of predetermined object classes, such as passenger car, truck, motorcycle and/or pedestrian.

The detection range can then be determined based on the determined distance of the predetermined object for the object class to which the detected predetermined object was assigned.

The detection range can then also be determined based on the determined distance of the predetermined object and a respective conversion value for the object class to which the detected predetermined object was not assigned.

The (current) detection range can moreover be determined based on a previously determined detection range which was determined, in particular using the method described above, prior to the detection range.

It is conceivable that the (current) detection range can be determined based on a combination of the determined detection range with the previously determined detection range using a weighted filter which gives a higher weight to the determined detection range and a lower weight to the previously determined detection range.

A detection range of the sensor can be divided into a plurality of zones, in particular horizontal zones, wherein the detection range for each zone is determined based on the predetermined object that is detected within the respective zone.

The aspects described above can be summarized in other words as follows:

In the first step of the method described above, data is collected from one or more sensors.

In the second step, all irrelevant detections can be filtered out, in other words all detections by way of the sensor of objects for which it cannot be guaranteed with sufficient certainty that they are real or true detections.

A criterion for this can be that the respective detected objects are filtered out which have been detected in less than a predetermined number of successive data sets that are acquired by way of the sensor.

For each initial object detection, in other words the first occurrence of an object, it is possible to determine a time stamp t0 and a relative position of this object in relation to the sensor or the motor vehicle at the point in time to. Then, after the same object has been continuously detected N times, such as 9 times, this object can be used at the point in time t0+N as a candidate for determining the detection range.

As soon as an object has been detected N times, in particular a list with a plurality of objects that have been detected N times is available, the field of view or the detection range of the sensor can be calculated in a third step of the method.

For this purpose, it is first determined when the respective object was first detected. It is conceivable that the detection of the respective object was not declared as a valid detection at this point in time, since the uncertainty as to whether the object actually exists was too great at this point in time.

For the determination of the detection range, a movement or a distance traveled between the relative position at the point in time to and the current point in time t0+N can then be taken into consideration in order to obtain a new relative position of the object. The distance of the detected object at the point in time to minus the distance that is traveled by the motor vehicle between the points in time to and t0+N is determined as the detection range of the sensor for that particular type of object.

Thus, a so-called self-movement compensation of the motor vehicle can be performed. In other words, at the point in time t0, a previously undetected object is detected at an x,y position relative to the motor vehicle. Now it can be decided whether the object is an actual object or a so-called ghost object, in other words a false positive detection of an object. This decision requires some computation cycles, in this case N cycles, and object tracking or tracking of the detected object during the computation cycles. However, the motor vehicle can continue to move during these computation cycles. This relative self-movement of the motor vehicle can now be subtracted from the relative x,y position of the detected object at point in time t0. The position at which the object was first detected is thus converted into a relative position with respect to the motor vehicle at the current point in time t0+N. It is conceivable, for example, that an object is detected for the first time at the position (100,0) at the point in time t0. After N cycles, the object is confirmed, whereby the motor vehicle has moved forward by 30 m during these N cycles. The transformed or converted relative position is then (70,0). Thus, the detection range would be 70 m in the present case.

Since a plurality of objects can be observed in parallel, it is conceivable to divide a field of view or a detection range of the sensor horizontally into individual segments and to derive the detection range for each segment individually. When a plurality of object candidates fall in the same segment, a data amount can be reduced by applying the max operation to the list of candidates in the same segment.

In addition, a detection range based on the detection range that is determined by way of the detected object can also be determined for other classes of objects to which the detected object does not belong. For this purpose, it is possible to use a model that models a relationship between a capability of the sensor to detect objects of different object types. For example, if a sensor can see or detect a car up to a distance of 200 m, then a smaller object, for example, a motorcyclist, can be detected up to 150 m, while an even smaller object, for example, a pedestrian, can only be detected up to 70 m.

This is advantageous, because for a determination of a detection range of pedestrians it cannot always be assumed that there are enough pedestrians in the vicinity of the motor vehicle, for example, when driving on a highway. Based on these models, the detection range of pedestrians can be inferred if other types of objects, for example, cars, are actually detected.

In the fourth step of the algorithm, the newly or currently determined detection range can be combined with a previously estimated detection range of the respective sensor. This can be done, for example, by using weighted filters that give new measurements a higher weight and existing measurements a lower weight. These filters render possible smooth variations in the detection range, and appropriate tuning of the weighting parameters renders possible faster or slower changes in the updates of the detection range, depending on the specific application case of the sensor.

Together with the determination of the detection range, the approach also renders possible a determination of an accuracy and information about the last update of the detection range. For example, a weighted variance of the last samples of the detection range of a sensor can be used to assess the uncertainty of the determined detection range. Similarly, information about when the detection range was last updated provides a level of information for higher level software which can decide how much to trust the particular detection range. This can be critical, for example, for adjusting parameters in conjunction with safety distances. For example, the detection range is regularly used for a calculation of a maximum safe speed of the motor vehicle.

It is conceivable that the maximum speed can be further reduced based on the estimated uncertainty of the detection range.

Moreover, a motor vehicle, in particular a passenger car, is provided. The motor vehicle comprises a sensor, which is arranged and designed in such a manner that it scans a surroundings of the motor vehicle, and a control device that is connected to the sensor.

The control device is designed in order to determine the detection range of the sensor by way of the method described above.

It is conceivable that the motor vehicle is an at least partially automated motor vehicle, in other words is designed in order to take over transverse and/or longitudinal guidance of the motor vehicle in an automated manner at least at times.

What is described with reference to the method also applies analogously to the apparatus and conversely.

BRIEF DESCRIPTION OF THE DRAWING

FIG. 1 shows a flow chart of a method for determining a detection range of a sensor that is installed on a motor vehicle and scans a surroundings of the motor vehicle.

DETAILED DESCRIPTION OF THE DRAWING

As is apparent in FIG. 1, the method for determining the detection range of the sensor that is installed in the motor vehicle and scans the surroundings of the motor vehicle has essentially four steps S1-S4.

The motor vehicle has a control device which is connected to the sensor in such a manner that it can receive data from the sensor which corresponds to the surroundings of the motor vehicle that is scanned by the sensor.

Based on this data, the control device is designed to perform the method described below. It is conceivable that, after the method described below is performed, the control device outputs a control signal to the motor vehicle, for example in order to control its speed, based on the detection range of the sensor that is determined by way of the method.

In a first step S1 of the method, a predetermined object in the surroundings of the motor vehicle is detected by way of the sensor, which in this case comprises a camera or is designed as a camera.

Subsequently, in the first step S1 of the method, it is determined whether the detected predetermined object is detected a plurality of times in succession, in particular within a predetermined period of time without interruption, in the surroundings of the motor vehicle by way of the sensor.

Furthermore, at least the first time the predetermined object is detected, a distance of this object to the motor vehicle, in particular to the sensor, is determined.

If this is the case, in other words if the predetermined object has been detected by the sensor a plurality of times in succession, for example nine times, then in a second step S2 the distance of the detected object to the motor vehicle is determined, which was determined at the point in time in the first step S1 at which the predetermined object was detected for the first time by way of the sensor.

In the third step S3 of the method, a determination is made of a distance which the motor vehicle has traveled since the point in time at which the predetermined object was detected the first of the plurality of times by way of the sensor.

Furthermore, the detected predetermined object is assigned to one of a plurality of predetermined object classes.

Subsequently, in the third step S3, a determination of the detection range for this object class to which the object was assigned is made based on the distance that is determined in the second step S2 and the determined traveled distance of the motor vehicle.

This means, only if the predetermined object has been detected a plurality of times in succession in the surroundings of the motor vehicle by way of the sensor, in other words if there is a predetermined probability of true detection, is the detection range determined based on the distance of the predetermined object at the time it was first detected by the sensor.

More specifically, the detection range of the object class to which the detected predetermined object was assigned is determined based on a difference between the distance of the predetermined object which was determined at the point in time at which the predetermined object was detected the first time of the plurality of times by way of the sensor, and the determined distance.

By way of a respective conversion value or a respective conversion formula, it is now possible based on the determined distance of the predetermined object, in particular based on the detection range that is determined for the object class to which the object was assigned, to determine the detection range for the further object classes to which the detected predetermined object was not assigned.

It is also conceivable that a detection range, in particular a horizontal detection range, in other words a 2D range, of the sensor is determined or estimated based on the determined detection range, in other words 1D value, of the sensor. Furthermore, it is conceivable that the detection range is divided into a plurality of in particular horizontal zones, wherein the detection range for each zone is determined based on the predetermined object that is detected within the respective zone.

In a fourth step S4, the detection range that is determined in the third step S3 (or, in the case of a plurality of object classes, the detection ranges that are determined in the third step S3) is combined with a previously determined detection range (or previously determined detected ranges).

This combining of the detection ranges can be performed by using one or more weighted filters which give a higher weight to the determined detection range and a lower weight to the previously determined detection range.

LIST OF REFERENCE SIGNS

S1-S4 Steps of the method

The invention claimed is:

1. A method for determining a detection range of a sensor that is installed on a motor vehicle and scans a surroundings of the motor vehicle, the method comprising:

detecting a predetermined object in the surroundings of the motor vehicle by way of the sensor, determining a first distance of the predetermined object to the motor vehicle, determining that the predetermined object has been detected a plurality of times in succession in the surroundings of the motor vehicle by way of the sensor, determining a second distance which the motor vehicle has traveled since a point in time at which the predetermined object was detected a first time of the plurality of times by way of the sensor, determining the detection range based on a difference between the first distance of the predetermined object, which was determined at the point in time at which the predetermined object was detected the first time of the plurality of times by way of the sensor, and the second distance, and controlling an operation of the motor vehicle based on the detection range.

2. The method according to claim 1, further comprising:

assigning the predetermined object to one of a plurality of predetermined object classes, wherein the detection range is determined based on the first distance of the predetermined object for the object class to which the predetermined object was assigned.

3. The method according to claim 1, further comprising:

assigning the predetermined object to one of a plurality of predetermined object classes, wherein the detection range is determined based on the first distance of the predetermined object and a respective conversion value for an object class to which the predetermined object was not assigned.

4. The method according to claim 1, further comprising:

determining a current detection range based on a previously determined detection range which was determined prior to the detection range.

5. The method according to claim 4, wherein:

the current detection range is determined based on a combination of the detection range with the previously determined detection range using a weighted filter which gives a higher weight to the detection range and a lower weight to the previously determined detection range.

6. The method according to claim 1, wherein:

the detection range of the sensor is divided into a plurality of zones, wherein a detection range for each zone is determined based on the predetermined object that is detected within the respective zone.

7. The method according to claim 1, wherein:

the detection range of the sensor is divided into a plurality of horizontal zones, wherein a detection range for each zone is determined based on the predetermined object that is detected within the respective zone.

* * * * *